US012784992B2

(12) United States Patent
Ando et al.

(10) Patent No.: US 12,784,992 B2
(45) Date of Patent: Nov. 3, 2026

(54) ELECTRONIC COMPONENT

(71) Applicant: Murata Manufacturing Co., Ltd., Nagaokakyo (JP)

(72) Inventors: Shota Ando, Nagaokakyo (JP); Toshiyuki Nakaiso, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 232 days.

(21) Appl. No.: 18/887,578

(22) Filed: Sep. 17, 2024

(65) Prior Publication Data

US 2025/0014833 A1 Jan. 9, 2025

Related U.S. Application Data

(63) Continuation of application No. PCT/JP2023/009641, filed on Mar. 13, 2023.

(30) Foreign Application Priority Data

Mar. 23, 2022 (JP) ................................ 2022-047045

(51) Int. Cl.
*H01G 4/33* (2006.01)
*H01G 4/005* (2006.01)

(52) U.S. Cl.
CPC ............... *H01G 4/33* (2013.01); *H01G 4/005* (2013.01)

(58) Field of Classification Search
CPC .......... H01G 4/005; H01G 4/012; H01G 4/30; H01G 4/33
See application file for complete search history.

(56) References Cited

U.S. PATENT DOCUMENTS

| | | | |
|---|---|---|---|
| 10,410,793 B2 | 9/2019 | Lim et al. |
| 2017/0338039 A1 | 11/2017 | Lim et al. |

(Continued)

FOREIGN PATENT DOCUMENTS

| | | |
|---|---|---|
| JP | H0547586 A | 2/1993 |
| JP | 3340690 B2 | 11/2002 |

(Continued)

OTHER PUBLICATIONS

International Search Report received for PCT Patent Application No. PCT/JP2023/009641, mailed on May 23, 2023, 2 pages (English Translation Only).

*Primary Examiner* — Nathan Milakovich
(74) *Attorney, Agent, or Firm* — ArentFox Schiff LLP

(57) ABSTRACT

An electronic component including: a semiconductor substrate; a dielectric layer adjacent a surface of the semiconductor substrate; a first internal electrode electrically connected to the semiconductor substrate; a second internal electrode adjacent a surface of the dielectric layer; an insulator layer adjacent the surface of the semiconductor substrate and covering the first internal electrode and the second internal electrode; a first extended electrode electrically connected to the first internal electrode; a second extended electrode electrically connected to the second internal electrode, wherein when viewed in a direction perpendicular to a plane of the semiconductor substrate, the second extended electrode is inside the second internal electrode; a first external electrode electrically connected to the first extended electrode; and a second external electrode electrically connected to the second extended electrode.

12 Claims, 7 Drawing Sheets

(56) References Cited

U.S. PATENT DOCUMENTS

| | | | | |
|---|---|---|---|---|
| 2021/0036100 | A1* | 2/2021 | Lu | H01G 4/012 |
| 2022/0384113 | A1 | 12/2022 | Take et al. | |
| 2025/0015001 | A1* | 1/2025 | Ando | H01F 17/00 |

FOREIGN PATENT DOCUMENTS

| | | | |
|---|---|---|---|
| JP | 2003-110030 | A | 4/2003 |
| JP | 2017-208528 | A | 11/2017 |
| JP | 2021-057374 | A | 4/2021 |

* cited by examiner

Prior Art

Prior Art

ELECTRONIC COMPONENT

CROSS REFERENCE TO RELATED APPLICATIONS

The present application is a continuation of International application No. PCT/JP2023/009641, filed Mar. 13, 2023, which claims priority to Japanese Patent Application No. 2022-047045, filed Mar. 23, 2022, the entire contents of each of which are incorporated herein by reference.

TECHNICAL FIELD

The present disclosure relates to an electronic component including a semiconductor substrate and configured by providing a capacitor and the like at the semiconductor substrate.

BACKGROUND ART

Patent Document 1 discloses a configuration of a MOS capacitor to be used for an internal voltage generating circuit of a semiconductor memory. FIG. 6A and FIG. 6B show a simplified example. This MOS capacitor has a P-type semiconductor substrate 11, an N-type well 12, an N+ diffusion layer 13, an $SiO_2$ for isolation 104, a gate insulating film 15, a gate 106 made of polycrystalline silicon or metal, an interlayer insulating film 113, a wiring layer 108, a protective layer 115, and a contact hole 116. This capacitor, similarly to a normal MOS capacitor, is provided between the gate 106 and a surface of the N-type well 12 across the gate insulating film 15.

[Patent Literature 1] Japanese Unexamined Patent Application Publication No. 2003-110030

BRIEF SUMMARY OF THE DISCLOSURE

The MOS capacitor of the structure disclosed in Patent Literature 1 generates quite a little parasitic impedance. For example, parasitic capacitance may be caused between the wiring layer 108, and the N-type well 12 or the semiconductor substrate 11, or a parasitic resistance component or a parasitic inductance component may be generated in the wiring layer 108 itself.

FIG. 7 is an equivalent circuit diagram of the MOS capacitor shown in FIG. 6A and FIG. 6B. Terminals T1 and T2 shown in FIG. 7 correspond to electrodes to which the wiring layer 108 of the electronic component shown in FIG. 6A and FIG. 6B is connected, and Capacitor C0 shown in FIG. 7 is a capacitor used as an original purpose. A capacitor C1 shown in FIG. 7 is the parasitic capacitance. An inductor L1 shown in FIG. 7 is the parasitic inductance component, and a resistor R1 is the parasitic resistive component.

In view of the foregoing, exemplary embodiments of the present disclosure are directed to provide an electronic component in which the capacitor of low parasitic impedance is provided at the semiconductor substrate.

An electronic component as one example of the present disclosure includes: a semiconductor substrate having a surface; a dielectric layer adjacent the surface of the semiconductor substrate; a first internal electrode electrically connected to the semiconductor substrate; a second internal electrode adjacent a surface of the dielectric layer; an insulator layer adjacent the surface of the semiconductor substrate and covering the first internal electrode and the second internal electrode; a first extended electrode electrically connected to the first internal electrode on a side thereof opposite to the semiconductor substrate; a second extended electrode electrically connected to the second internal electrode on a side thereof opposite to the semiconductor substrate, wherein when viewed in a direction perpendicular to a plane of the semiconductor substrate, the second extended electrode is inside the second internal electrode; a first external electrode electrically connected to the first extended electrode on a side thereof opposite to the first internal electrode; and a second external electrode electrically connected to the second extended electrode on a side thereof opposite to the second internal electrode.

According to the present disclosure, an electronic component in which the capacitor of low parasitic impedance is provided at the semiconductor substrate is able to be obtained.

DESCRIPTION OF EXEMPLARY EMBODIMENTS

Figure 1A:
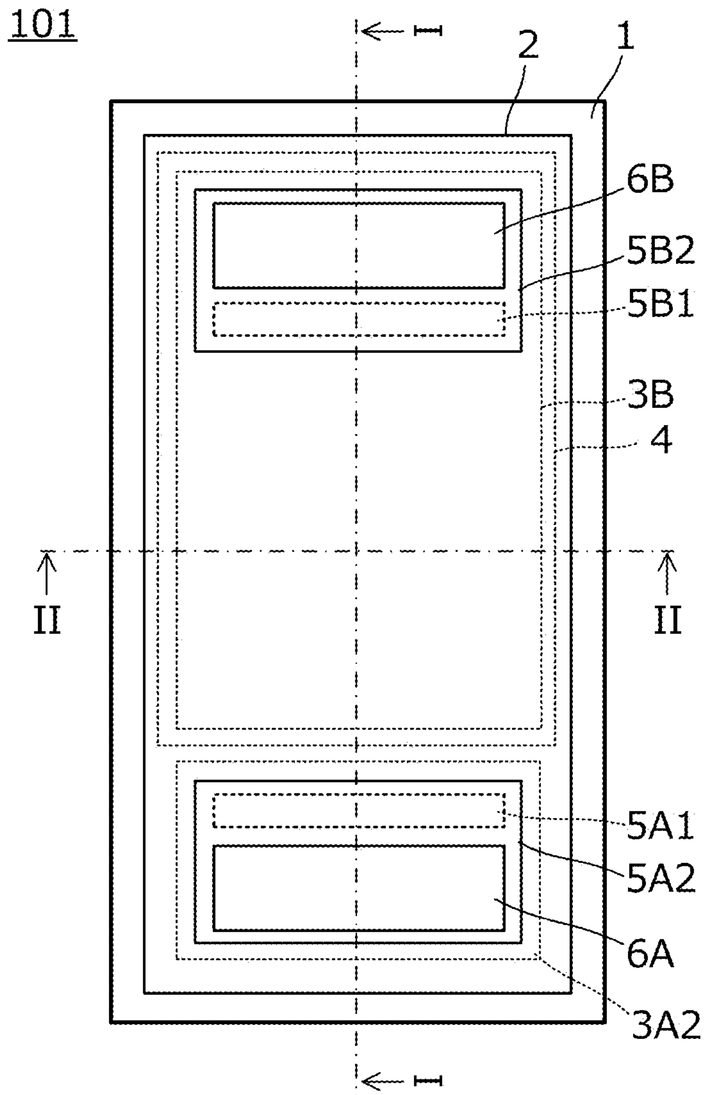
FIG. 1A is a plan view of an electronic component 101 according to a first exemplary embodiment of the present disclosure.

Hereinafter, a plurality of exemplary embodiments of the present disclosure will be described with reference to the attached drawings and several specific examples. In the drawings, components and elements assigned with the same reference numerals or symbols will represent identical components and elements. While an exemplary embodiment of the present disclosure is divided and described into a plurality of exemplary aspects for the sake of convenience in consideration of ease of description or understanding of main points, elements described in different exemplary embodiments are able to be partially replaced or combined with each other. In the second and subsequent exemplary embodiments, a description of features common to the first exemplary embodiment will be omitted, and only different features will be described. In particular, the same advantageous functions and effects by the same configurations will not be described one by one for each exemplary embodiment.

First Exemplary Embodiment

Figure 1B:
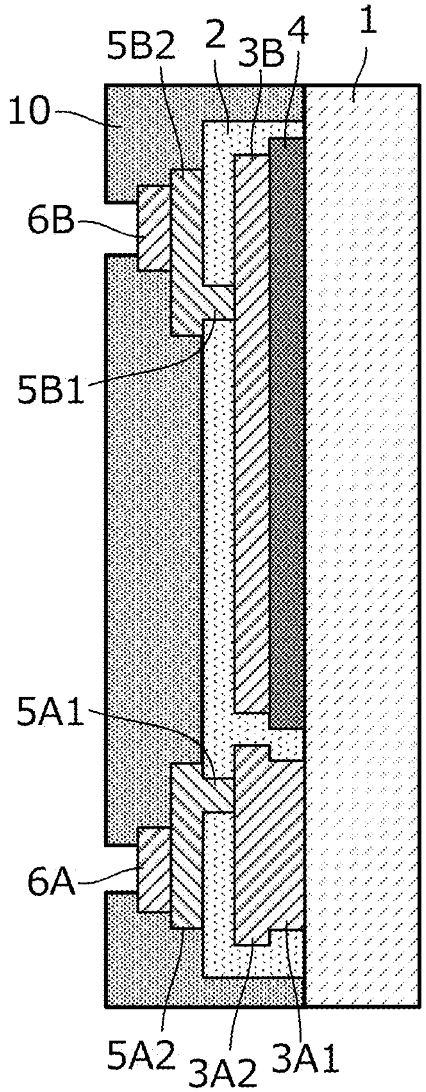
FIG. 1B is a cross-sectional view taken along a line I-I in FIG. 1A.
Figure 1C:
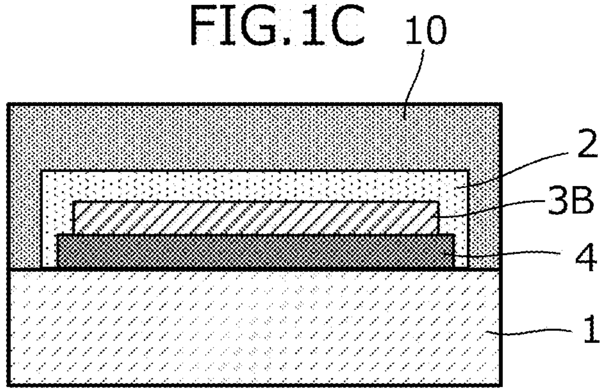
FIG. 1C is a cross-sectional view taken along a line II-II in FIG. 1A.

FIG. 1A is a plan view of an electronic component 101 according to a first exemplary embodiment of the present disclosure, FIG. 1B is a cross-sectional view taken along a line I-I in FIG. 1A, and FIG. 1C is a cross-sectional view taken along a line II-II in FIG. 1A. However, FIG. 1A is a plan view of a state before a protective film 10 to be described below is provided.

This electronic component 101 includes a semiconductor substrate 1, an insulator layer 2 provided near a surface layer of the semiconductor substrate 1, first internal electrodes 3A1 and 3A2 provided in the insulator layer 2, a second internal electrode 3B provided in the insulator layer 2, a dielectric layer 4 made of a thermal oxide film provided near the surface layer of the semiconductor substrate 1, first extended electrodes 5A1 and 5A2 electrically connected to the first internal electrodes 3A1 and 3A2, on a side closer to the surface layer than to the first internal electrodes 3A1 and 3A2, second extended electrodes 5B1 and 5B2 electrically connected to the second internal electrode 3B, on a side closer to the surface layer than to the second internal electrode 3B, a first external electrode 6A electrically connected to the first extended electrodes 5A1 and 5A2, on a side closer to the surface layer than to the first extended electrodes 5A1 and 5A2, a second external electrode 6B electrically connected to the second extended electrodes 5B1 and 5B2, on a side closer to the surface layer than to the second extended electrodes 5B1 and 5B2, and a protective film 10.

As examples, the semiconductor substrate 1 is a substrate made of an impurity semiconductor such as a carrier doped silicon substrate, the insulator layer 2 is an SiN film, the dielectric layer 4 is an $SiO_2$ film being a thermal oxide film of the semiconductor substrate 1, the first internal electrodes 3A1 and 3A2 and the second internal electrode 3B are Al films, the first extended electrodes 5A1 and 5A2 and the second extended electrodes 5B1 and 5B2 are Cu films, the first external electrode 6A and the second external electrode 6B are metal films of which the ground is Ni and the surface is Au, and the protective film 10 is an organic insulating film such as solder resist.

The second internal electrode 3B configures a capacitor electrode provided on the dielectric layer 4. The semiconductor substrate 1, such being a substrate made of an impurity semiconductor such as a carrier doped silicon substrate, has conductivity. Therefore, the semiconductor substrate 1, the dielectric layer 4, and the second internal electrode 3B configure main portions of a capacitor.

The first external electrode 6A, the first extended electrodes 5A1 and 5A2, the first internal electrodes 3A1 and 3A2 are electrically connected to the semiconductor substrate 1, and the second external electrode 6B, the second extended electrodes 5B1 and 5B2 are electrically connected to the second internal electrode 3B.

The first external electrode 6A and the second external electrode 6B each are used as a connection pad such as a pad for wire bonding or a pad for surface mounting. Therefore, this electronic component 101 functions as a capacitor having the external electrode 6A and the second external electrode 6B.

By using the silicon semiconductor substrate as one electrode and the silicon thermal oxide film as the dielectric layer, the capacitor provided in the electronic component 101 according to the present exemplary embodiment is able to set a highly accurate capacitance.

In addition, according to the present exemplary embodiment, when viewed in a direction perpendicular to a plane of the semiconductor substrate 1, since the second extended electrodes 5B1 and 5B2 are provided inside the second internal electrode 3B, the parasitic capacitance between the second extended electrodes 5B1 and 5B2 and the semiconductor substrate 1 is able to be reduced. Moreover, since the second external electrode 6B electrically connected to the second extended electrode 5B1 and 5B2 are provided on the second extended electrodes 5B1 and 5B2, the parasitic inductance or parasitic resistance by the second extended electrodes 5B1 and 5B2 is able to be significantly reduced. Furthermore, since the first extended electrodes 5A1 and 5A2 are provided on the first internal electrodes 3A1 and 3A2 and the first external electrode 6A electrically connected to the first extended electrodes 5A1 and 5A2 are provided on the first extended electrodes 5A1 and 5A2, the parasitic inductance and parasitic resistance by the first extended electrodes 5A1 and 5A2 is able to be significantly reduced.

As a result, an electronic component provided with a capacitor similar to a capacitance element of which the electrical characteristics are ideal is able to be configured, and a low-loss circuit is able to be achieved in a high-frequency circuit, so that circuit characteristics as intended design are able to be achieved.

Second Exemplary Embodiment

In a second exemplary embodiment, an electronic component different in the configuration of the internal electrode and the dielectric layer from the example shown in the first exemplary embodiment will be described.

Figure 2A:
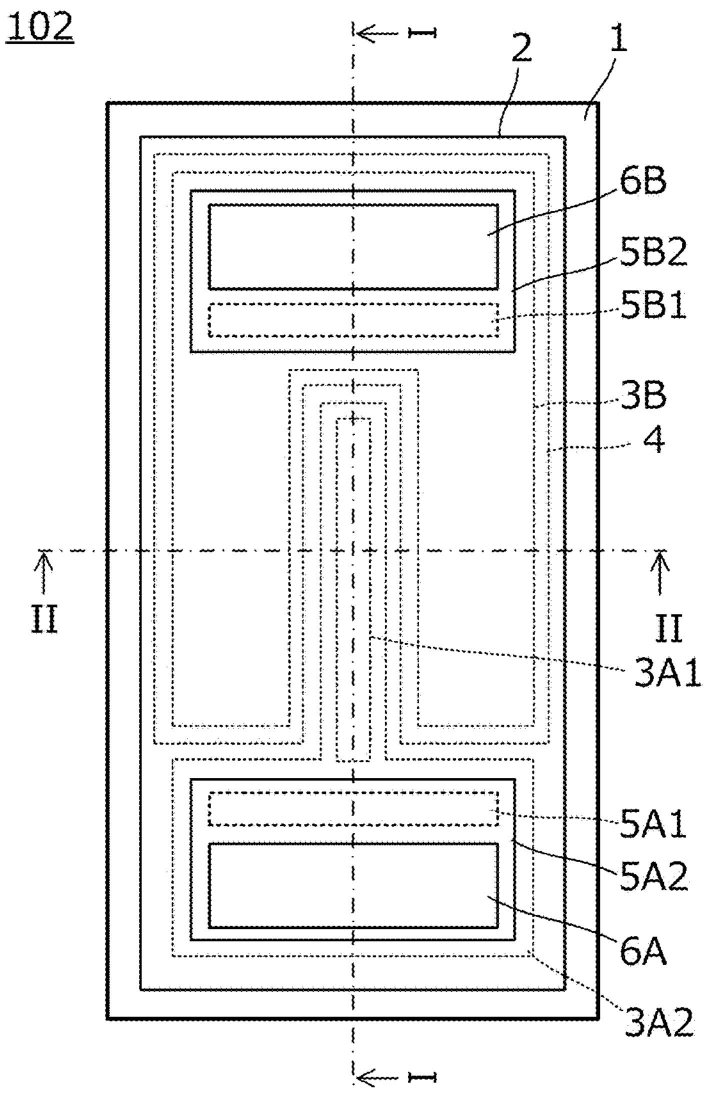
FIG. 2A is a plan view of an electronic component 102 according to a second exemplary embodiment of the present disclosure.
Figure 2B:
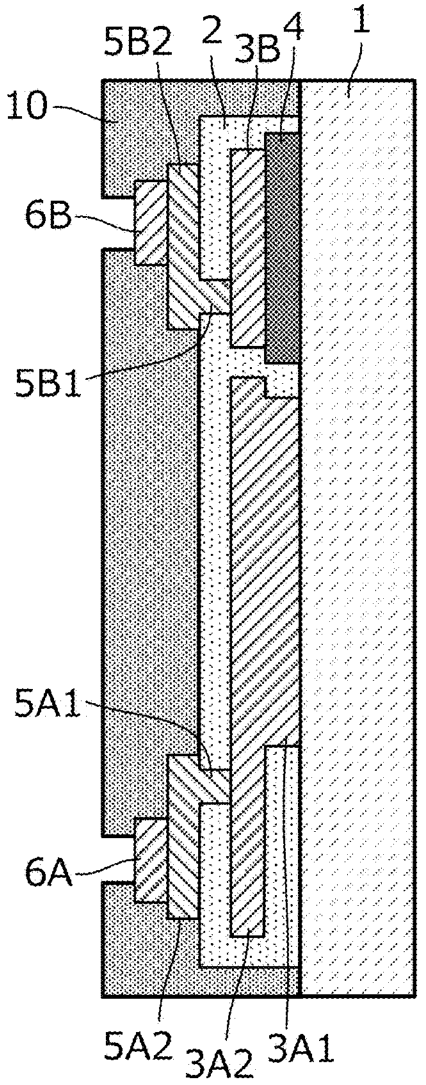
FIG. 2B is a cross-sectional view taken along a line I-I in FIG. 2A.
Figure 2C:
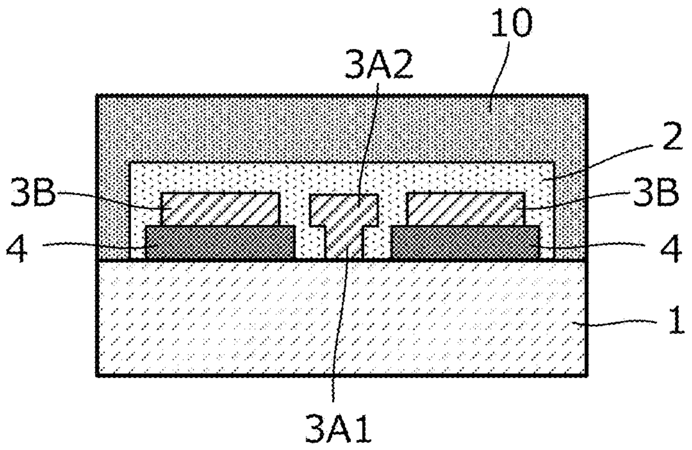
FIG. 2C is a cross-sectional view taken along a line II-II in FIG. 2A.

FIG. 2A is a plan view of an electronic component 102 according to the second exemplary embodiment of the present disclosure, FIG. 2B is a cross-sectional view taken along a line I-I in FIG. 2A, and FIG. 2C is a cross-sectional view taken along a line II-II in FIG. 2A. However, FIG. 2A is a plan view of a state before a protective film 10 is provided.

This electronic component 102 includes a semiconductor substrate 1, an insulator layer 2 provided near a surface layer of the semiconductor substrate 1, first internal electrodes 3A1 and 3A2 provided in the insulator layer 2, a second internal electrode 3B provided in the insulator layer 2, a dielectric layer 4 made of a thermal oxide film provided near the surface layer of the semiconductor substrate 1, first extended electrodes 5A1 and 5A2 electrically connected to the first internal electrodes 3A1 and 3A2, on a side closer to the surface layer than to the first internal electrodes 3A1 and 3A2, second extended electrodes 5B1 and 5B2 electrically connected to the second internal electrode 3B, on a side closer to the surface layer than to the second internal electrode 3B, a first external electrode 6A electrically connected to the first extended electrodes 5A1 and 5A2, on a side closer to the surface layer than to the first extended electrodes 5A1 and 5A2, a second external electrode 6B electrically connected to the second extended electrodes 5B1 and 5B2, on a side closer to the surface layer than to the second extended electrodes 5B1 and 5B2, and a protective film 10.

As examples, the semiconductor substrate 1 is a substrate made of an impurity semiconductor such as a carrier doped silicon substrate, the insulator layer 2 is an SiN film, the dielectric layer 4 is an $SiO_2$ film being a thermal oxide film of the semiconductor substrate 1. The first internal electrodes 3A1 and 3A2 and the second internal electrode 3B are Al films, the first extended electrodes 5A1 and 5A2 and the second extended electrodes 5B1 and 5B2 are Cu films. The first external electrode 6A and the second external electrode 6B are metal films of which the ground is Ni and the surface is Au. The protective film 10 is an organic insulating film such as solder resist.

The electronic component 102 is different in the shapes of the first internal electrodes 3A1 and 3A2, the second internal electrode 3B, and the dielectric layer 4, from the electronic component 101 shown in FIG. 1A, FIG. 1B, and FIG. 1C. In the electronic component 102, when viewed in the direction perpendicular to the plane of the semiconductor substrate 1, the dielectric layer 4 has a recessed shape. Accordingly, the second internal electrode 3B also has a recessed shape. On the other hand, the overall shape of the first internal electrodes 3A1 and 3A2 is protruded, and the facing portions of the first internal electrodes 3A1 and 3A2 and the second internal electrode 3B face each other in an uneven manner. In other words, the first internal electrode 3A1 has a linear portion extended toward the second external electrode 6B, and the second internal electrode 3B is placed so as to surround the extended portion. In addition, as shown in FIG. 2A, the first internal electrode 3A1 and the second internal electrode 3B are provided so that a distance of sides of the first internal electrode 3A1 and the second internal electrode 3B may be constant (a distance of sides that face the first internal electrode 3A1 and the second internal electrode 3B may be constant) in a region in which the first internal electrode 3A1 and the second internal electrode 3B face each other.

The second internal electrode 3B configures a capacitor electrode provided on the dielectric layer 4. The semiconductor substrate 1, the dielectric layer 4, and the second internal electrode 3B configure main portions of a capacitor. Other configurations are the same as the configurations of the electronic component 101 described in the first exemplary embodiment.

According to the second exemplary embodiment, since the region in which the first internal electrodes 3A1 and 3A2 and the second internal electrode 3B face each other is large, an average path length of a current flowing through the semiconductor substrate 1 in a horizontal direction is reduced.

Generally, in the MOS capacitor using the silicon semiconductor substrate as one electrode and the silicon thermal oxide film as the dielectric layer, the current flows through the silicon semiconductor substrate in the horizontal direction (the direction along the surface). This current concentrates near the surface of the silicon semiconductor substrate according to the skin effect of the current, for example, in a high-frequency region of 1 GHz or more. This phenomenon increases an ESR (Equivalent Series Resistance), which deteriorates the characteristics of the capacitor. The increase in the ESR according to the skin effect, although occurring also in metal with high conductivity, occurs more significantly in the semiconductor substrate with lower conductivity than the metal. In the present exemplary embodiment, since the average path length of the current flowing through the semiconductor substrate 1 in the horizontal direction is short, the ESR caused by the semiconductor substrate 1 is low. Accordingly, a low ESR capacitor is obtained.

It is to be noted that, compared with an electronic component 105 to be shown in the following fifth exemplary embodiment, an area of a region in which the first internal electrode 3A1 and the semiconductor substrate 1 are electrically connected to each other is able to be reduced, so that a capacitor with a higher capacitance density is able to be provided.

Third Exemplary Embodiment

In a third exemplary embodiment, an electronic component different in the configuration of the internal electrode and the dielectric layer from the example shown in the first and second exemplary embodiments will be described.

Figure 3A:
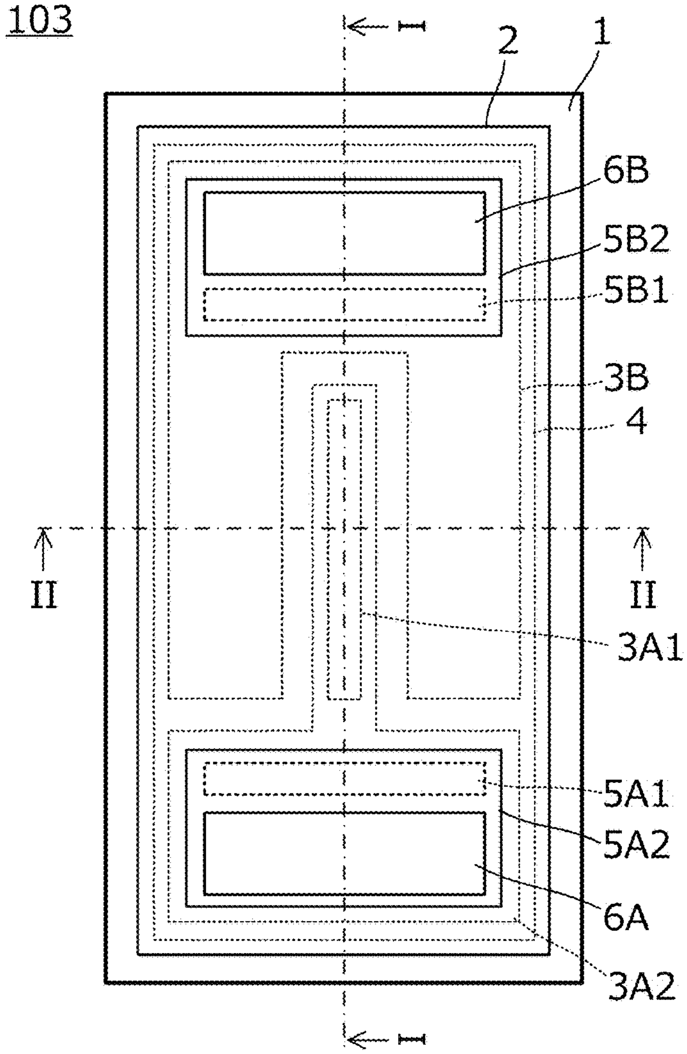
FIG. 3A is a plan view of an electronic component 103 according to a third exemplary embodiment of the present disclosure.
Figure 3B:
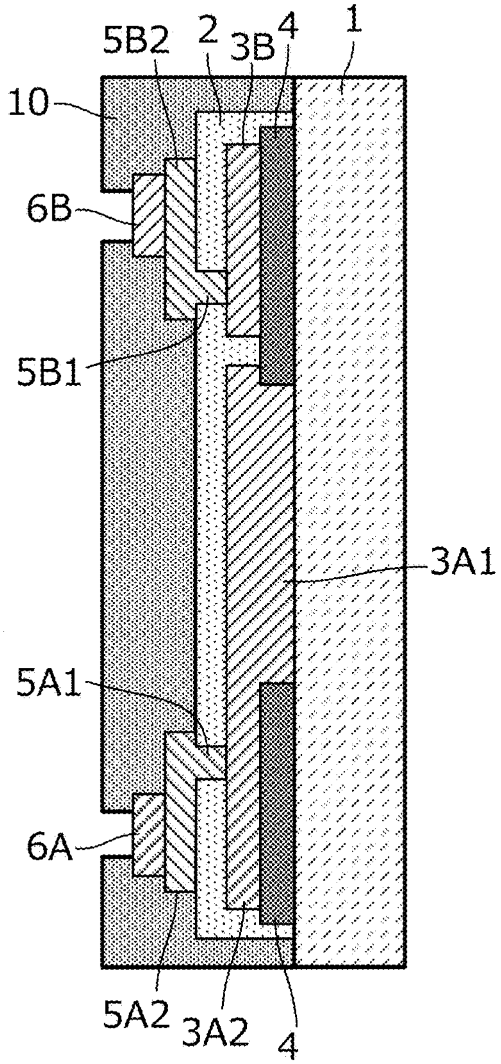
FIG. 3B is a cross-sectional view taken along a line I-I in FIG. 2A.
Figure 3C:
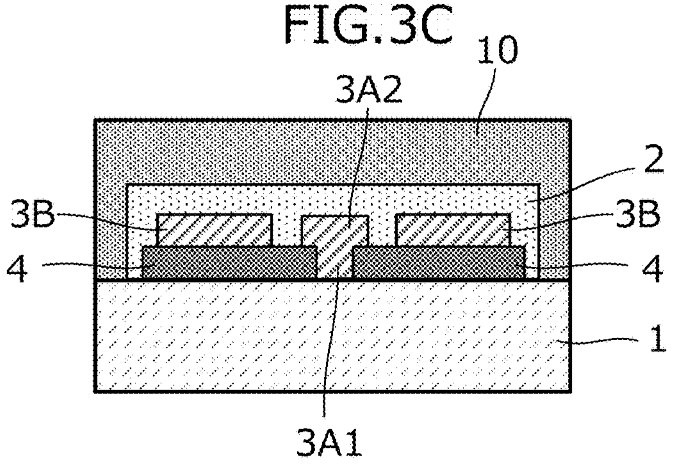
FIG. 3C is a cross-sectional view taken along a line II-II in FIG. 3A.

FIG. 3A is a plan view of an electronic component 103 according to the third exemplary embodiment of the present disclosure, FIG. 3B is a cross-sectional view taken along a line I-I in FIG. 3A, and FIG. 3C is a cross-sectional view taken along a line II-II in FIG. 3A. However, FIG. 3A is a plan view of a state before a protective film 10 is provided.

This electronic component 103 includes a semiconductor substrate 1, an insulator layer 2 provided near a surface layer of the semiconductor substrate 1, first internal electrodes 3A1 and 3A2 provided in the insulator layer 2, a second internal electrode 3B provided in the insulator layer 2, a dielectric layer 4 made of a thermal oxide film provided near the surface layer of the semiconductor substrate 1, first extended electrodes 5A1 and 5A2 electrically connected to the first internal electrodes 3A1 and 3A2, on a side closer to the surface layer than to the first internal electrodes 3A1 and 3A2, second extended electrodes 5B1 and 5B2 electrically connected to the second internal electrode 3B, on a side closer to the surface layer than to the second internal electrode 3B, a first external electrode 6A electrically connected to the first extended electrodes 5A1 and 5A2, on a side closer to the surface layer than to the first extended electrodes 5A1 and 5A2, a second external electrode 6B electrically connected to the second extended electrodes 5B1 and 5B2, on a side closer to the surface layer than to the second extended electrodes 5B1 and 5B2, and a protective film 10.

The electronic component 103 is different in the shapes of the first internal electrodes 3A1 and 3A2 and the dielectric layer 4, from the electronic component 102 shown in FIG. 2A, FIG. 2B, and FIG. 2C. In the electronic component 103, when viewed in the direction perpendicular to the plane of the semiconductor substrate 1, the dielectric layer 4 is also provided on a lower surface of the first internal electrode 3A2. In addition, the first internal electrode 3A1 is provided in an opening portion of the dielectric layer 4.

The second internal electrode 3B configures a capacitor electrode provided on the dielectric layer 4. The semiconductor substrate 1, the dielectric layer 4, and the second internal electrode 3B configure main portions of a capacitor. Other configurations are the same as the configurations of the electronic component 102 described in the second exemplary embodiment.

According to the present exemplary embodiment, the dielectric layer 4 at a lower portion of the first internal electrode 3A2 functions as a height adjustment layer of this first internal electrode 3A2. In other words, during a process in which the first internal electrode 3A2 is provided, this first internal electrode 3A2 is significantly reduced from hanging down toward the semiconductor substrate 1. As a result, the heights of the first external electrode 6A and the second external electrode 6B are easily aligned. As a result, during wire bonding of the electronic component 103, the wire bonding accuracy to the first external electrode 6A and the second external electrode 6B is able to be increased. Alternatively, an impact of surface mounting the electronic component 103 is able to be prevented from concentrating on one external electrode.

It is to be noted that a portion that configures the height adjustment layer of the first internal electrode 3A2 in order to align the heights of the first external electrode 6A and the second external electrode 6B, and a portion that configures the main portions of the capacitor may be provided so that the dielectric layer 4 may serve as a different body.

Fourth Exemplary Embodiment

In a fourth exemplary embodiment, an electronic component different in the configuration of the internal electrode and the dielectric layer from the examples shown above will be described.

Figure 4A:
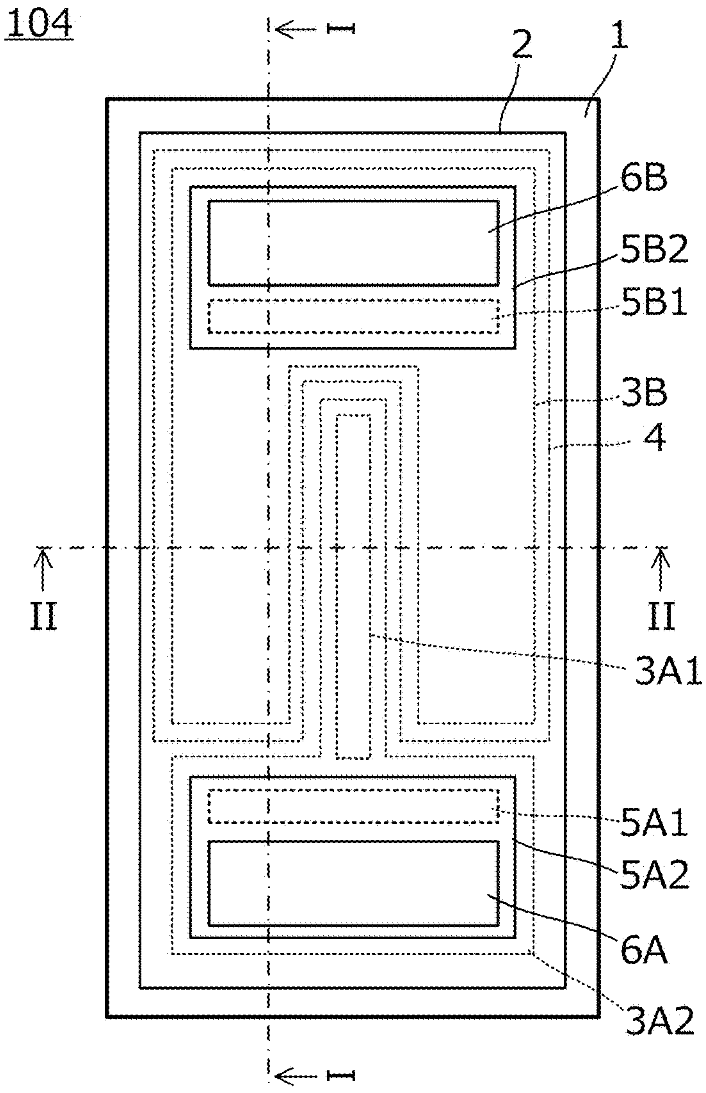
FIG. 4A is a plan view of an electronic component 104 according to a fourth exemplary embodiment of the present disclosure.
Figure 4B:
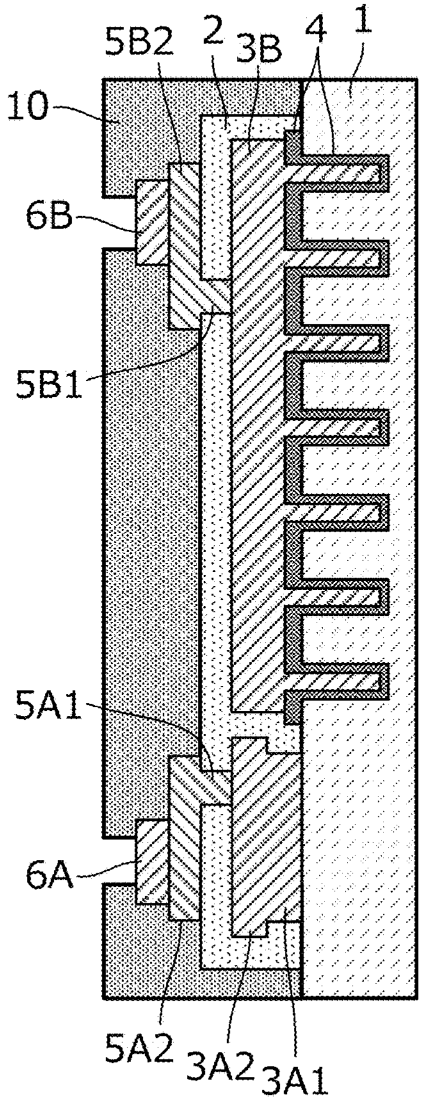
FIG. 4B is a cross-sectional view taken along a line I-I in FIG. 4A.
Figure 4C:
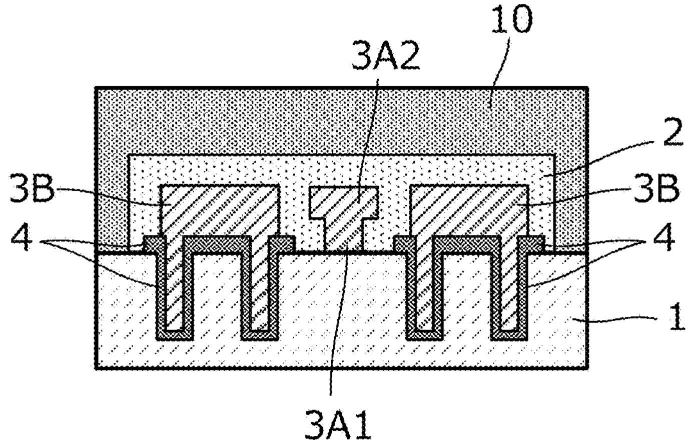
FIG. 4C is a cross-sectional view taken along a line II-II in FIG. 4A.

FIG. 4A is a plan view of an electronic component 104 according to the fourth exemplary embodiment of the present disclosure, FIG. 4B is a cross-sectional view taken along a line I-I in FIG. 4A, and FIG. 4C is a cross-sectional view taken along a line II-II in FIG. 4A. However, FIG. 4A is a plan view of a state before a protective film 10 is provided.

While the dielectric layer 4 and the second internal electrode 3B are planarly provided at an upper portion of the semiconductor substrate 1 in the electronic component 102 shown in FIG. 2B, a plurality of trenches are provided at an upper portion of the semiconductor substrate 1 in the electronic component 104 of the fourth exemplary embodiment. The trenches in this example are not groove-shaped but cylindrical. The dielectric layer 4 is provided on inner surfaces of these trenches, and a portion of the second internal electrode 3B is internally buried in the trenches.

According to the present exemplary embodiment, an area which the second internal electrode 3B and the semiconductor substrate 1 face each other through the dielectric layer 4 is able to be increased, which enables a reduction in a space for a plane area of a region in which the capacitor is provided.

Fifth Exemplary Embodiment

In a fifth exemplary embodiment, an electronic component different in the configuration of the internal electrode and the dielectric layer from the example shown in the first and second exemplary embodiments will be described.

Figure 5A:
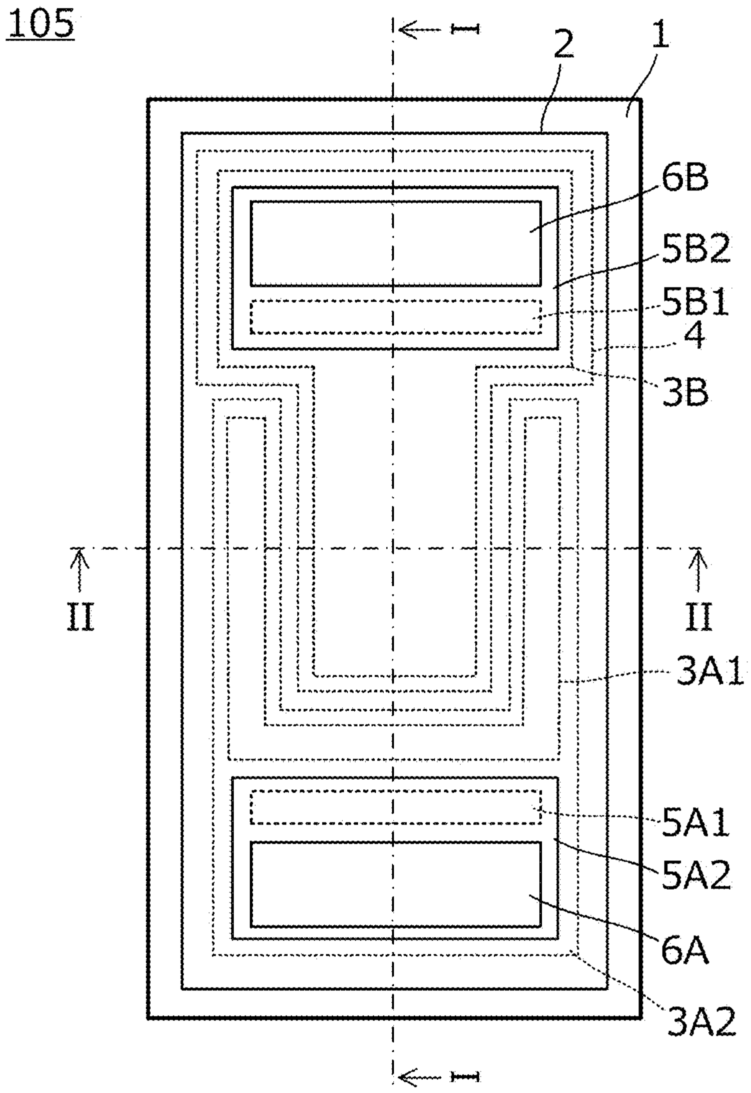
FIG. 5A is a plan view of an electronic component 105 according to a fifth exemplary embodiment of the present disclosure.
Figure 5B:
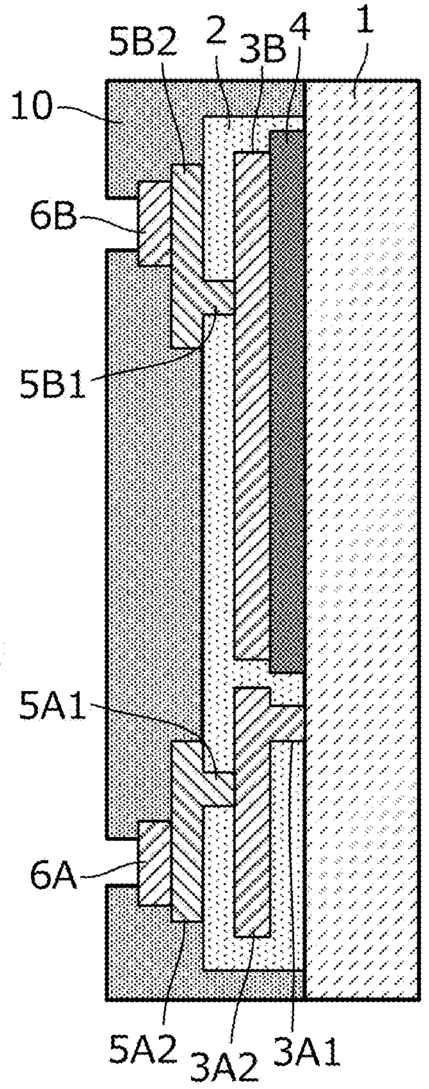
FIG. 5B is a cross-sectional view taken along a line I-I in FIG. 5A.
Figure 5C:
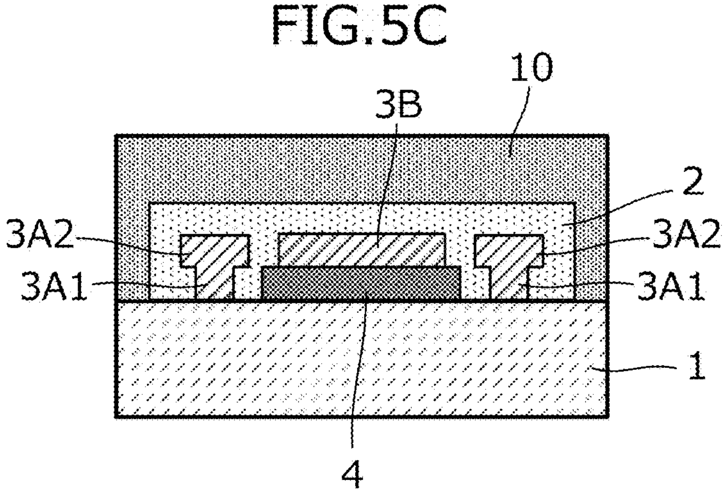
FIG. 5C is a cross-sectional view taken along a line II-II in FIG. 5A.
Figure 6A:
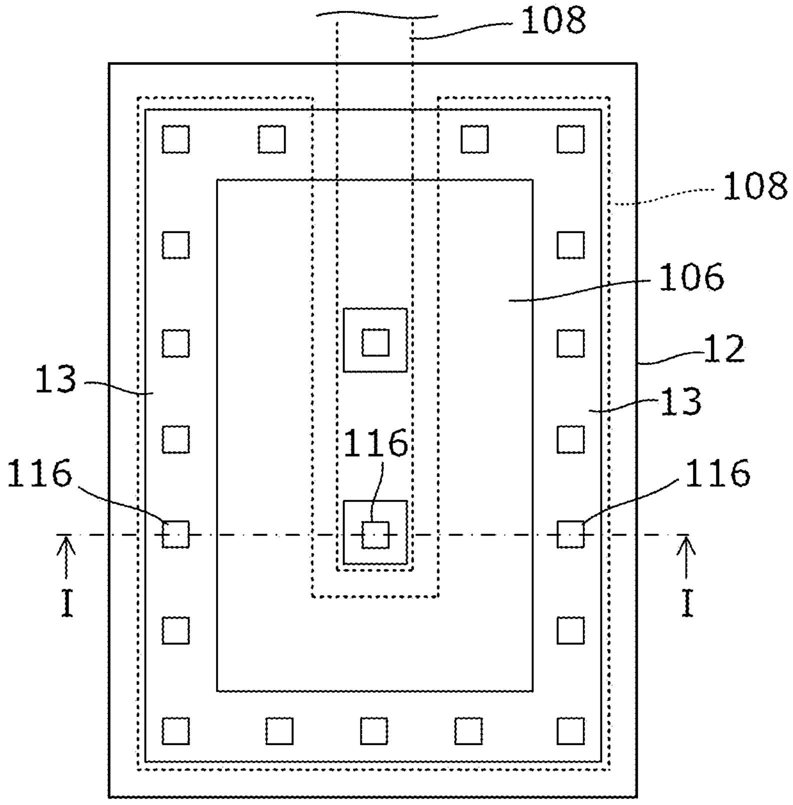
FIG. 6A and FIG. 6B are views showing a simplified MOS capacitor to be used for an internal voltage generating circuit of a semiconductor memory disclosed in Patent Literature 1.
Figure 6B:
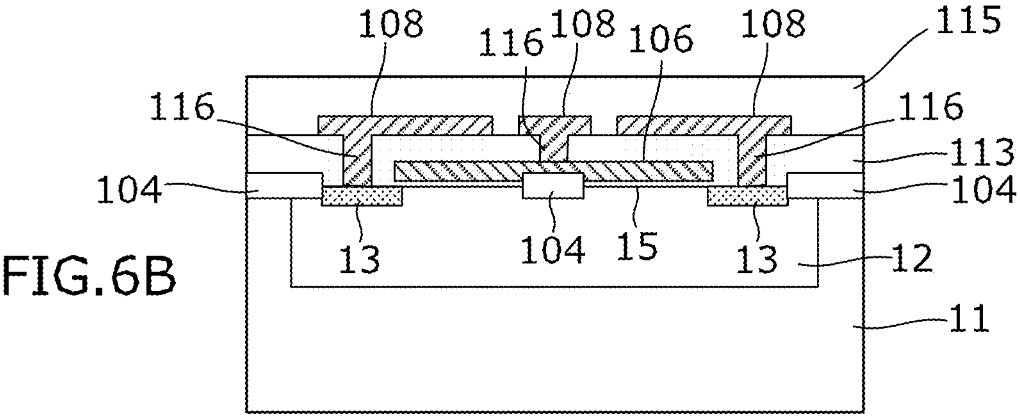
Prior Art FIG.6B
Figure 7:
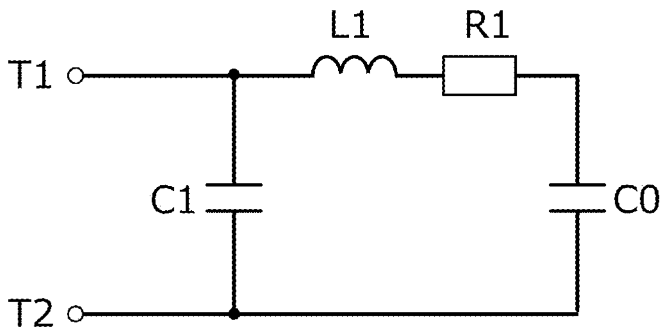
FIG. 7 is an equivalent circuit diagram of the MOS capacitor shown in FIG. 6A and FIG. 6B.

FIG. 5A is a plan view of an electronic component 105 according to the fifth exemplary embodiment of the present disclosure, FIG. 5B is a cross-sectional view taken along a line I-I in FIG. 5A, and FIG. 5C is a cross-sectional view taken along a line II-II in FIG. 5A. However, FIG. 5A is a plan view of a state before a protective film 10 is provided.

This electronic component 105 includes a semiconductor substrate 1, an insulator layer 2 provided near a surface layer of the semiconductor substrate 1, first internal electrodes 3A1 and 3A2 provided in the insulator layer 2, a second internal electrode 3B provided in the insulator layer 2, a dielectric layer 4 made of a thermal oxide film provided near the surface layer of the semiconductor substrate 1, first extended electrodes 5A1 and 5A2 electrically connected to the first internal electrodes 3A1 and 3A2, on a side closer to the surface layer than to the first internal electrodes 3A1 and 3A2, second extended electrodes 5B1 and 5B2 electrically connected to the second internal electrode 3B, on a side closer to the surface layer than to the second internal electrode 3B, a first external electrode 6A electrically connected to the first extended electrodes 5A1 and 5A2, on a side closer to the surface layer than to the first extended electrodes 5A1 and 5A2, a second external electrode 6B electrically connected to the second extended electrodes 5B1 and 5B2, on a side closer to the surface layer than to the second extended electrodes 5B1 and 5B2, and a protective film 10.

While, in the example shown in FIG. 2A, FIG. 2B, and FIG. 2C, when viewed in the direction perpendicular to the plane of the semiconductor substrate 1, the dielectric layer 4 and the second internal electrode 3B have a recessed shape and the overall shape of the first internal electrodes 3A1 and 3A2 is protruded, the dielectric layer 4 and the second internal electrode 3B have a protruded shape and the overall shape of the first internal electrodes 3A1 and 3A2 is recessed in the electronic component 105 according to the fifth exemplary embodiment. The facing portions of the first internal electrodes 3A1 and 3A2 and the second internal electrode 3B face each other in an uneven manner. In other words, a portion of the second internal electrode 3B linearly extends toward the first external electrode 6A, and the second internal electrode 3B is placed so that the first internal electrode 3A1 may surround the extended portion of the second internal electrode 3B. In addition, the first internal electrode 3A1 and the second internal electrode 3B are provided so that the distance of the sides of the first internal electrode 3A1 and the second internal electrode 3B may be constant (the distance of the sides that face the first internal electrode 3A1 and the second internal electrode 3B may be constant) in the region in which the first internal electrode 3A1 and the second internal electrode 3B face each other.

According to the present exemplary embodiment, similarly to the electronic component 102 shown the second exemplary embodiment, a capacitor with significantly reduced parasitic inductance or parasitic resistance and with the low ESR is obtained.

Finally, the present disclosure is not limited to the foregoing exemplary embodiments. Various modifications or changes can be appropriately made by those skilled in the art. The scope of the present disclosure is defined not by the foregoing exemplary embodiments but by the following claims. Furthermore, the scope of the present disclosure is intended to include all possible modifications or changes from the exemplary embodiments within the scopes of the claims and the scopes of equivalents.

While each exemplary embodiment shows the electronic component including a capacitor and an inductor as a passive component, the present disclosure is also applicable to an electronic component including an active component as well as a passive component.

While the second exemplary embodiment to the fifth exemplary embodiment show an example of the electronic component in which, when viewed in the direction perpendicular to the plane of the semiconductor substrate 1, the facing portions of the second internal electrode 3B and the first internal electrodes 3A1 and 3A2 face each other in an uneven manner, the present disclosure is also applicable to an electronic component in which, when viewed in the direction perpendicular to the plane of the semiconductor substrate 1, the facing portions of the second internal electrode 3B and the first internal electrodes 3A1 and 3A2 face each other in a comb-shaped manner.

REFERENCE SIGNS LIST

C0, C1—capacitor
L1—inductor

R1—resistor
T1, T2—terminal
1—semiconductor substrate
2—insulator layer
3A1, 3A2—first internal electrode
3B—second internal electrode
4—dielectric layer
5A1, 5A2—first extended electrode
5B1, 5B2—second extended electrode
6A—first external electrode
6B—second external electrode
10—protective film
11—semiconductor substrate
12—well
13—diffusion layer
15—gate insulating film
101, 102, 103, 104, 105—electronic component
106—gate
108—wiring layer
113—interlayer insulating film
115—protective layer
116—contact hole

The invention claimed is:

1. An electronic component comprising:
- a semiconductor substrate having a surface;
- a dielectric layer adjacent the surface of the semiconductor substrate;
- a first internal electrode electrically connected to the semiconductor substrate;
- a second internal electrode adjacent a surface of the dielectric layer;
- an insulator layer adjacent the surface of the semiconductor substrate and covering the first internal electrode and the second internal electrode;
- a first extended electrode electrically connected to the first internal electrode on a side thereof opposite to the semiconductor substrate;
- a second extended electrode electrically connected to the second internal electrode on a side thereof opposite to the semiconductor substrate, wherein when viewed in a direction perpendicular to a plane of the semiconductor substrate, the second extended electrode is inside the second internal electrode;
- a first external electrode electrically connected to the first extended electrode on a side thereof opposite to the first internal electrode; and
- a second external electrode electrically connected to the second extended electrode on a side thereof opposite to the second internal electrode.

2. The electronic component according to claim 1, wherein the dielectric layer is a thermal oxide film of the semiconductor substrate.

3. The electronic component according to claim 1, wherein, when viewed in the direction perpendicular to the plane of the semiconductor substrate, facing portions of the first internal electrode and the second internal electrode face each other in an uneven manner or in a comb-shaped manner.

4. The electronic component according to claim 3, wherein a distance between respective sides of the first internal electrode and the second internal electrode facing each other is constant.

5. The electronic component according to claim 3, wherein:
- the first internal electrode has an extended portion extending linearly toward the second extended electrode; and
- the second internal electrode surrounds the extended portion of the first internal electrode.

6. The electronic component according to claim 3, wherein:
- the second internal electrode has an extended portion extending linearly toward the first extended electrode; and
- the first t internal electrode surrounds the extended portion of the second internal electrode.

7. The electronic component according to claim 1, wherein the semiconductor substrate includes a trench in a portion of the surface, and the dielectric layer is in the trench.

8. The electronic component according to claim 7, wherein the trench is cylindrical.

9. The electronic component according to claim 7, wherein a portion of the second internal electrode is in the trench.

10. The electronic component according to claim 1, wherein the dielectric layer is also between the semiconductor substrate and the first internal electrode.

11. The electronic component according to claim 10, wherein the first internal electrode is in an opening portion of the dielectric layer.

12. The electronic component according to claim 1, wherein the semiconductor substrate, the dielectric layer, and the second internal electrode comprise a capacitor.

* * * * *